US008079806B2

(12) United States Patent
Tholen et al.

(10) Patent No.: US 8,079,806 B2
(45) Date of Patent: Dec. 20, 2011

(54) SEGMENTED CERAMIC LAYER FOR MEMBER OF GAS TURBINE ENGINE

(75) Inventors: Susan M. Tholen, Kennebunk, ME (US); Christopher W. Strock, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1053 days.

(21) Appl. No.: 11/946,114

(22) Filed: Nov. 28, 2007

(65) Prior Publication Data

US 2009/0136345 A1 May 28, 2009

(51) Int. Cl.
*F01D 25/00* (2006.01)

(52) U.S. Cl. ............... 415/171.1; 415/173.1; 415/173.6; 415/173.7; 415/200

(58) Field of Classification Search ............... 415/170.1, 415/174.5, 171.1, 173.1, 173.4, 173.5, 173.6, 415/173.7, 174.4, 200
See application file for complete search history.

(56) References Cited

U.S. PATENT DOCUMENTS

| | | | |
|---|---|---|---|
| 4,652,209 A * | 3/1987 | Buddenbohm | 415/174.4 |
| 4,758,480 A | 7/1988 | Hecht | |
| 5,352,540 A | 10/1994 | Schienle et al. | |
| 5,687,679 A | 11/1997 | Mullin | |
| 5,830,586 A | 11/1998 | Gray | |
| 5,933,976 A | 8/1999 | Pressutti | |
| 5,951,892 A | 9/1999 | Wolfla | |
| 6,102,656 A | 8/2000 | Nissley | |
| 6,113,347 A * | 9/2000 | Forrester | 415/9 |
| 6,224,963 B1 | 5/2001 | Strangman | |
| 6,435,826 B1 | 8/2002 | Allen | |
| 6,435,835 B1 | 8/2002 | Allen | |
| 6,543,991 B2 * | 4/2003 | Sathianathan et al. | 415/9 |
| 6,589,600 B1 * | 7/2003 | Hasz et al. | 427/264 |
| 6,703,137 B2 | 3/2004 | Subramanian | |
| 6,830,428 B2 * | 12/2004 | Le Biez et al. | 415/173.4 |
| 7,302,990 B2 * | 12/2007 | Bunker et al. | 164/28 |

FOREIGN PATENT DOCUMENTS

| | | |
|---|---|---|
| EP | 1283278 | 2/2003 |
| EP | 1808507 | 7/2007 |
| EP | 1844863 | 10/2007 |
| GB | 2061397 | 5/1981 |

OTHER PUBLICATIONS

European Search Report mailed Mar. 2, 2009.

* cited by examiner

*Primary Examiner* — Igor Kershteyn
(74) *Attorney, Agent, or Firm* — Carlson, Gaskey & Olds, P.C.

(57) ABSTRACT

A turbine seal member for use in a gas turbine engine includes a turbine seal substrate having a gas-path side and a ceramic layer disposed on the gas-path side that includes a plurality of mechanical indentations.

27 Claims, 3 Drawing Sheets

SEGMENTED CERAMIC LAYER FOR MEMBER OF GAS TURBINE ENGINE

The government may have certain rights to this invention pursuant to Contract No. F33615-03-D-2354 Delivery Order 0009 awarded by the United States Air Force.

BACKGROUND OF THE INVENTION

This disclosure relates to protective layers and methods of manufacturing protective layers having mechanical indentations for facilitating stress relief.

Components that are exposed to high temperatures, such as a component within a gas turbine engine, typically include protective coatings. For example, components such as turbine blades, turbine vanes, and blade outer air seals typically include one or more coating layers that function to protect the component from erosion, oxidation, corrosion or the like to thereby enhance component durability and maintain efficient operation of the engine. In particular, conventional outer air seals include an abradable ceramic coating that contacts tips of the turbine blades such that the blades abrade the coating upon operation of the engine. The abrasion between the outer air seal and the blade tips provides a minimum clearance between these components such that gas flow around the tips of the blades is reduced to thereby maintain engine efficiency.

One drawback of the abradable type of coating is its vulnerability to erosion and spalling. For example, spalling may occur as a loss of portions of the coating that detach from the outer air seal. Loss of the coating increases clearance between the outer air seal and the blade tips, and is detrimental to turbine efficiency. One cause of spalling is the elevated temperature within the turbine section, which causes sintering of a surface layer of the coating. The sintering causes the coating to shrink, which produces stresses between the coating and a substrate of the outer air seal. If the stresses are great enough, the coating may delaminate and detach from the substrate.

SUMMARY OF THE INVENTION

The disclosed turbine seal member and methods are for facilitating reduction of internal stresses in a ceramic layer of the turbine seal member.

In one example, the turbine seal member includes a turbine seal substrate having a gas-path side and a ceramic layer disposed on the gas path side. The ceramic layer includes a plurality of mechanical indentations for facilitating reduction of internal stresses.

In some examples, each mechanical indentation is pyramid-shaped and tapers from a surface of the ceramic layer to an apex. The ceramic layer may be compacted near the apexes to a greater density than a remaining portion of the ceramic layer.

An example method of controlling internal stresses of a ceramic layer of the turbine seal member includes mechanically indenting the ceramic layer to form a plurality of mechanical indentations. The mechanical indentations provide preexisting locations for releasing energy associated with internal stresses of the ceramic layer.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
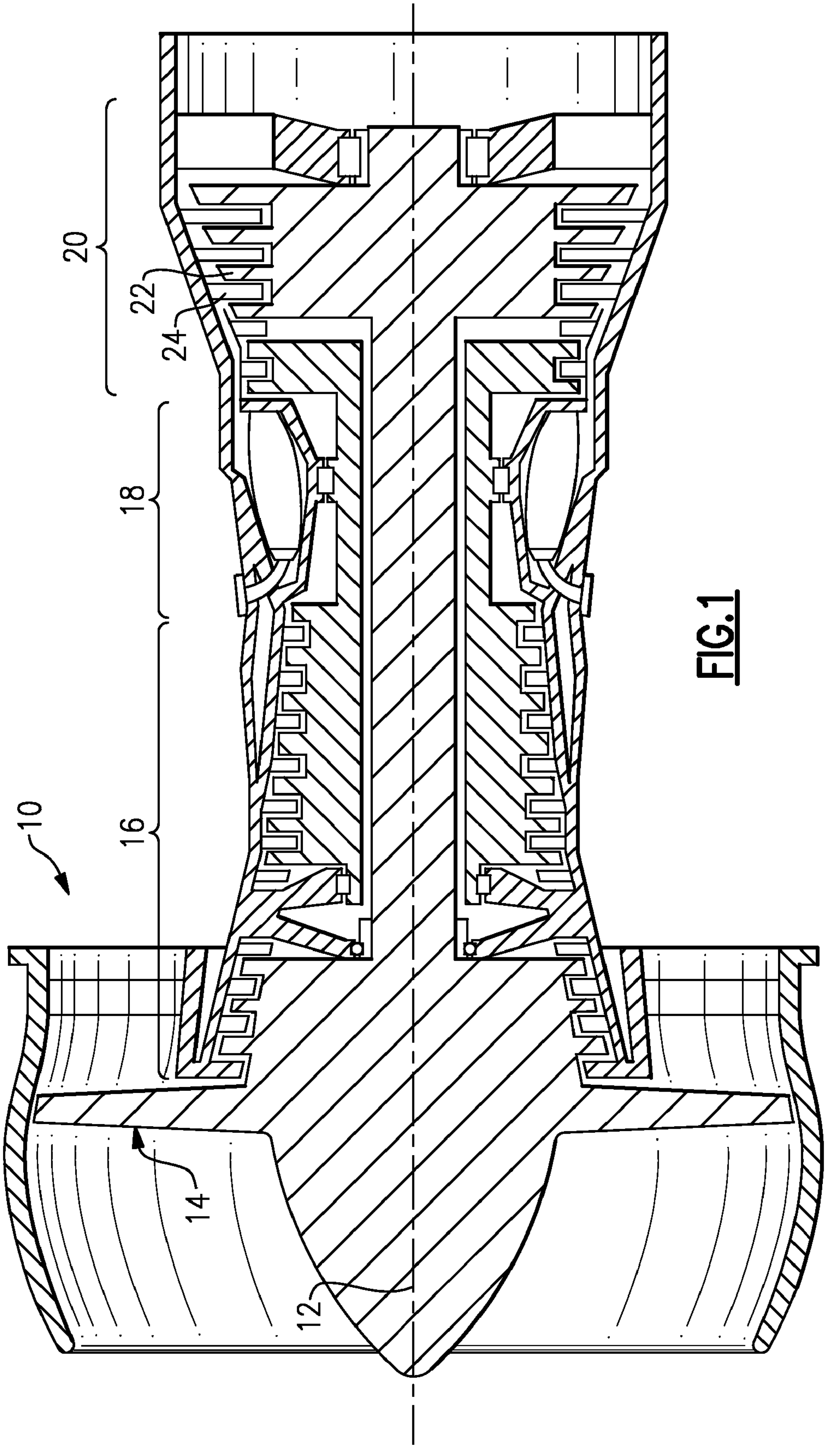
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18 and a turbine section 20 that includes turbine blades 22 and turbine vanes 24. As is known, air compressed in the compressor section 16 is mixed with fuel that is burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
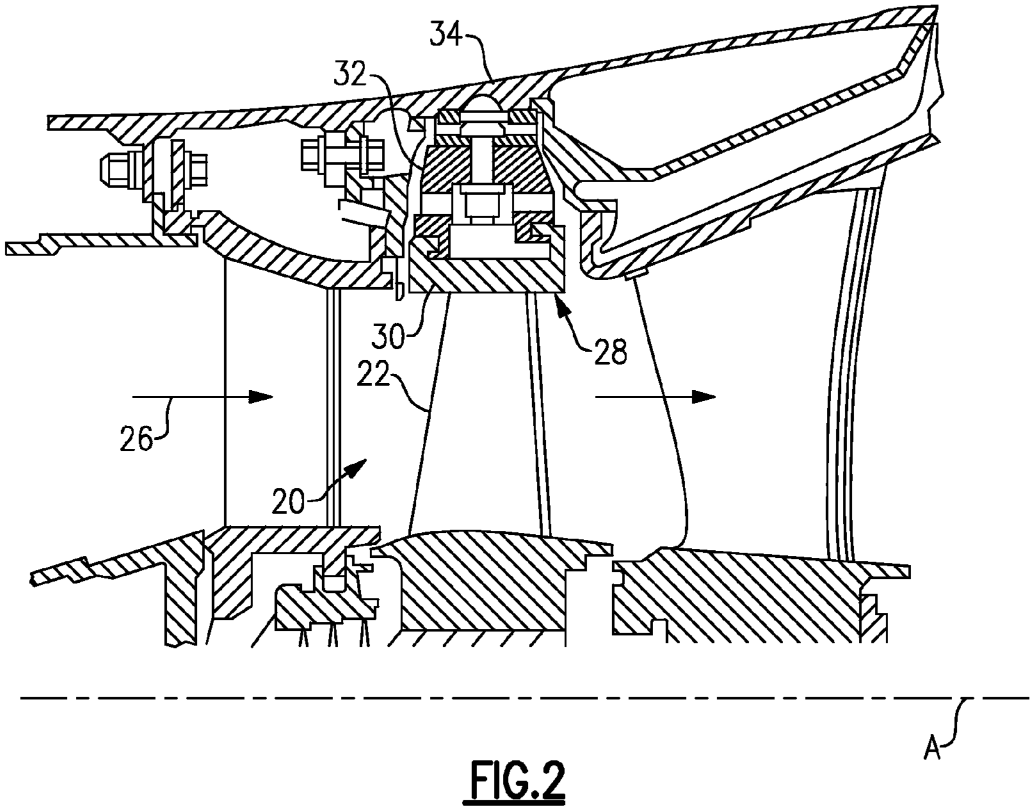
FIG. 2 illustrates selected portions of a turbine section of the gas turbine engine.

FIG. 2 illustrates selected portions of the turbine section 20. The turbine blade 22 receives a hot gas flow 26 from the combustion section 18 (FIG. 1). The turbine section 20 includes a blade outer air seal system 28 having a seal member 30 that functions as an outer wall for the hot gas flow 26 through the turbine section 20. The seal member 30 is secured to a support 32, which is in turn secured to a case 34 that generally surrounds the turbine section 20. For example, a plurality of the seal members 30 are circumferentially located about the turbine section 20.

Figure 3:
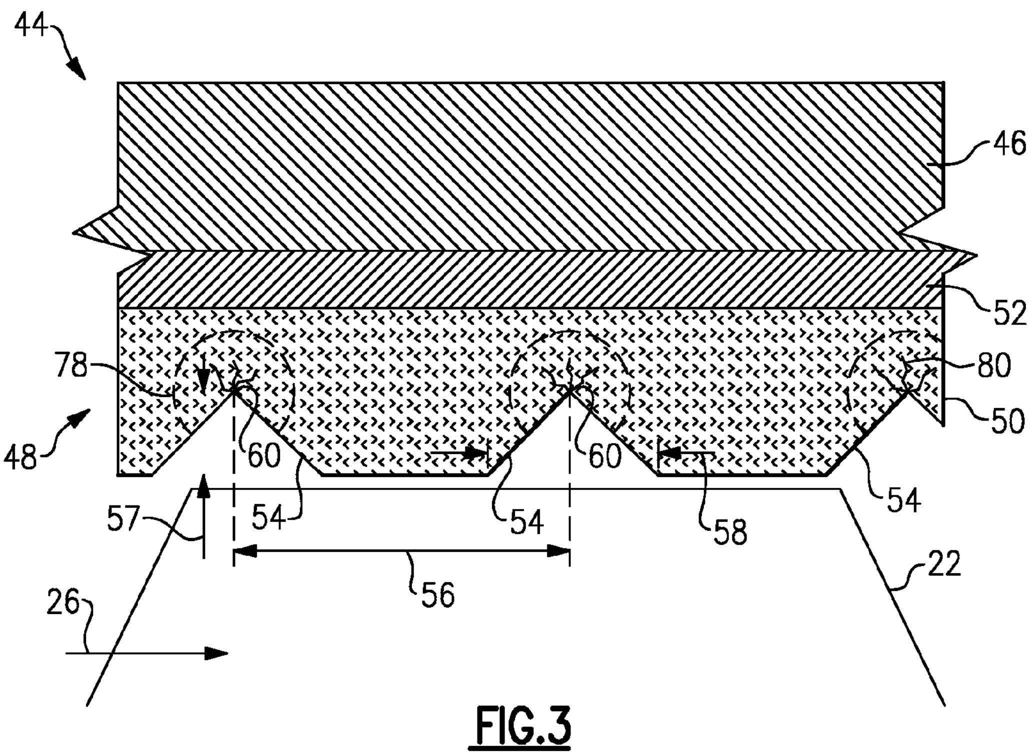
FIG. 3 illustrates an example portion of a seal member in the turbine section.

FIG. 3 illustrates an example portion 44 of the seal member 30. In this example, the seal member 30 includes a substrate 46 having a coating system 48 disposed on the side of the seal member 30 that is exposed to the hot gas flow 26. The coating system 48 includes a ceramic layer 50, such as an abradable ceramic coating (e.g., zirconia), and a bond layer 52 between the ceramic layer 50 and the substrate 46. For example, the bond layer 52 includes a nickel alloy, platinum, gold, silver, or MCrAlY, where the M includes at least one of nickel, cobalt, iron, or a combination thereof, Cr is chromium, Al is aluminum and Y is yttrium. Although a particular coating system 48 is shown, it is to be understood that the disclosed examples are not limited to the illustrated configuration and may include bond layers having a plurality of layers, no bond layer at all, or multiple ceramic layers. Furthermore, although the disclosed example is for the seal member 30, it is to be understood that the examples herein may also be applied to other types of engine or non-engine components and coating types.

The ceramic layer 50 is segmented by mechanical indentations 54 that extend partially through a thickness of the ceramic layer 50. The mechanical indentations 54 function to reduce internal stresses within the ceramic layer 50 that occur from sintering of the ceramic layer 50 at relatively high service temperatures within the turbine section 20 during use in the gas turbine engine 10. For example, service temperatures of about 2,500° F. (1,370° C.) and higher cause sintering near the exposed surfaced of the ceramic layer 50. The sintering may result in partial melting, densification, and diffusional shrinkage of the ceramic layer 50 and thereby induce internal stresses within the ceramic layer 50. If not relieved, the internal stresses may cause delamination cracking within the ceramic layer 50 or between the ceramic layer 50 and the bond layer 52. The mechanical indentations 54 provide pre-existing locations for releasing energy associated with the internal stresses (e.g., reducing shear and radial stresses). That is, the energy associated with the internal stresses is dissipated through cracking in the thickness direction of the ceramic layer 50 that initiates from the mechanical indentations 54, such as from the apexes 60. Thus, by facilitating cracking in the thickness direction, which does not cause delamination, the mechanical indentations 54 reduce the amount of energy that is available for delamination cracking between the ceramic layer 50 and the bond layer 52.

The mechanical indentations 54 can be characterized as having an average indentation spacing 56, an average indentation depth 57, an average indentation span 58, and an indentation density including the number of the mechanical indentations 54 per unit surface area of the ceramic layer 50. For example, the characteristics may be determined or estimated in any suitable manner, such as by using microscopy techniques.

The mechanical indentations 54 may be formed with any suitable indentation density, which corresponds to the average indentation spacing 56. In some examples, the indentation density corresponds to an average indentation spacing 56 that is about equal to the thickness of the ceramic layer 50, which facilitates producing an indentation density that is greater than a cracking density that would naturally occur from sintering cracking during service. An indentation density that is greater than a cracking density that would naturally occur from sintering cracking provides the benefit of a greater degree of stress relief than would naturally occur. For example, the indentation density is about 10-200 indentations per inch, which corresponds to an average indentation spacing 56 of about 0.100-0.005 inches (2.541-0.381 mm). In another embodiment, the indentation density is about 6.67 indentations per inch. In another embodiment, the indentation density is about 200 indentations per inch. The term "about" as used in this description relative to geometries, distances, temperatures, or the like refers to possible variation in the given value, such as normally accepted variations or tolerances in the art.

The mechanical indentations 54 may also be formed with any suitable average indentation span 58. In some examples, the average indentation span 58 is about equivalent to the average indentation depth 57. For example, the average indentation span is about 0.005-0.015 inches (0.127-0.381 mm). As can be appreciated, the average indentation span 58 may alternatively be greater than or less than the average indentation depth 57, depending on the needs of a particular application, on the properties of the ceramic layer 50, the amount of force used to form the mechanical indentations 54, the shape of the mechanical indentations 54, and the like, for example.

Figure 4:
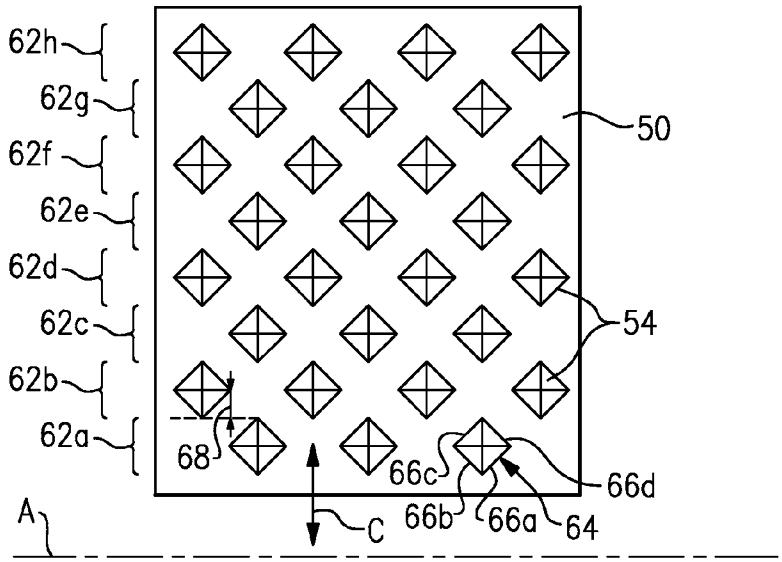
FIG. 4 illustrates a pattern of mechanical indentations of a ceramic layer of the seal member.

Referring also to FIG. 4, the mechanical indentations 54 may be formed with any suitable shape and with any suitable pattern on the ceramic layer 50. For example, the mechanical indentations 54 are symmetrical pyramid-shaped indentations such that each mechanical indentation 54 tapers from the surface of the ceramic layer 50 to an apex 60. The symmetry facilitates equal cracking through the thickness direction of the ceramic layer 50 extending from each corner of the indentation. When the indentations 54 are aligned in rows parallel to the diagonal across the mechanical indentations 54, cracks may bridge between mechanical indentations 54. Depending on the indentation spacing 56, coating thickness and properties and the characteristics of the mechanical indentations 54, the cracks may completely form at the time of indentation, initiate but not propagate completely, or the mechanical indentations 54 may form stress concentration sites or local regions of additive residual stress, all of which can result in the desired stress relief during service.

The mechanical indentations 54 may be formed in any suitable pattern on the ceramic layer 50. For example, the mechanical indentations are formed in rows 62*a*-*h* that extend approximately parallel to the engine centerline 12. Each of the rows 62*a*-*h* is axially offset from its neighboring rows. For example, 62*c* is axially offset from rows 62*b* and 62*d* such that the mechanical indentations 54 of row 62*c* are not aligned in a circumferential direction, C, with the mechanical indentations 54 of rows 62*b* and 62*d*. Thus, the mechanical indentations 54 are in a staggered pattern, which facilitates a more meandering crack pattern through ceramic layer 50 rather than cracks that bridge between mechanical indentations 54 in order to prevent a grid like segmentation structure that may be more prone to sequential spallation from edges.

Additionally, each of the mechanical indentations 54 may be formed in any suitable orientation relative to the engine centerline axis A, or alternatively to the sides of the seal member 30. For example, each mechanical indentation 54 includes a mouth 64 having sides 66*a*, 66*b*, 66*c*, and 66*d*. In the illustrated example, the sides 66*a*, 66*b*, 66*c*, and 66*d* are oriented at about a 45° angle 68 to the engine centerline axis A. For example, orienting the mechanical indentations 54 at the angle 68 may facilitate a random cracking pattern or residual stresses that lead to a random crack pattern that forms in directions that are perpendicular to the sintering stresses in service, as opposed to forming in a pattern dictated by the indentation pattern.

Figure 5:
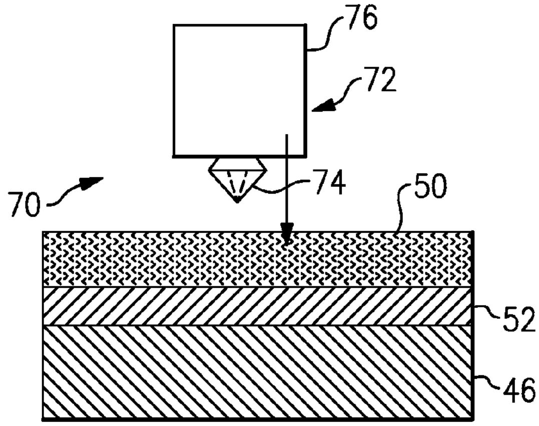
FIG. 5 illustrates an example method for forming the mechanical indentations.
Figure 6:
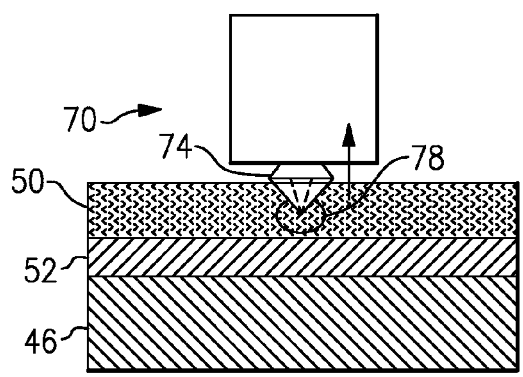
FIG. 6 illustrates the example method for forming the mechanical indentations.

FIGS. 5 and 6 illustrate an example method 70 of manufacturing an article having the ceramic layer 50, such as the seal member 30, with the mechanical indentations 54. In this example, a mechanical indenter 72 is used to form the mechanical indentations 54. For example, the mechanical indenter 72 includes an indenter member 74 mounted to a base 76. The indenter member 74 may be made of a hard material, such as diamond, that is suitable for mechanically indenting the ceramic layer 50. For example, the indenter member 74 is harder than the ceramic layer 50, such that the indenter member 74 is not significantly damaged in forming the mechanical indentations 54.

The indenter member 74 is moved into the ceramic layer 50 (FIG. 5) with a force that is suitable to form the mechanical indentation 54. Upon removal of the indenter member 74 from the ceramic layer 50 (FIG. 6), the mechanical indentation 54 remains. For example, the indenter member 74 may be moved manually, or moved using an automated or semi-automated machine.

In the indenting process, the indenter member 74 compacts a portion of the ceramic layer 50 to thereby form a compacted ceramic region 78 near each apex 60. That is, the ceramic material within the compacted ceramic region 76 is compacted to a density that is greater than the remaining portion of the ceramic layer 50 (e.g., portions outside of the compacted ceramic regions 78). Thus, the process of forming the mechanical indentations 54 does not remove any ceramic material from the ceramic layer 50 and thereby facilitates preserving the thermal barrier properties of the ceramic layer 50. During indentation, the compaction occurs in regions of compressive stress, while along the ridges of the indenter and at the apex 60 tensile stresses are generated. The tensile stresses may or may not cause crack formation at the time of indentation. Additionally, upon removal of the indentation load, there is further development of the local stress field as a result of the deformation and compaction caused by indentation. The residual stresses may also cause crack formation or propagation immediately following indentation, or may act as an additive component to the sintering shrinkage stresses during service.

Additionally, the force of compacting the ceramic material of the ceramic layer 50 may cause microcracks 80 near the apexes 60. The microcracks 80 generally extend in the thickness direction and radially outward from the indentation corners in the ceramic layer 50 and may function as initiation locations for sintering cracking in the thickness direction.

Figure 7:
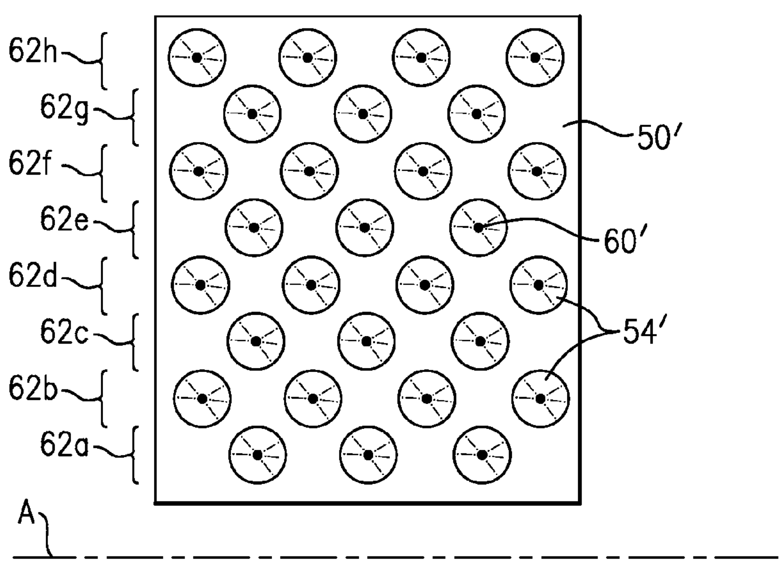
FIG. 7 illustrates another example pattern of mechanical indentations of a ceramic layer.

Alternatively, the indenter member 74 may have any shape that is suitable for forming mechanical indentations 54 with other desired shapes, such as conical. FIG. 7 illustrates another example ceramic layer 50' that may be used in the coating system 48 of the seal member 30 in place of the ceramic layer 50, where like reference numerals represent like features. In this example, the ceramic layer 50' includes conical-shaped mechanical indentation 54' that each taper from the surface of the ceramic layer 50' to an apex 60' and have only one continuous side wall rather than distinct side walls as for the pyramid shape. For example, a conically shaped indenter member 74 may be used to produce small cracks at the apexes 60' and leave residual stresses with the benefit of a more random crack pattern that forms more in the directions perpendicular to the sintering stresses in service as opposed to forming in a pattern dictated by the indentation pattern.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine seal member for use in a gas turbine engine, comprising:
- a turbine seal substrate having a gas-path side; and
- a ceramic layer disposed on the gas-path side of the turbine seal substrate, the ceramic layer having a plurality of mechanical indentations that taper from a surface of the ceramic layer to an apex with a corresponding plurality of compacted ceramic regions adjacent the apexes.

2. The turbine seal member as recited in claim 1, wherein each of the plurality of mechanical indentations is symmetrical.

3. The turbine seal member as recited in claim 1, wherein each of the plurality of mechanical indentations is pyramid shaped.

4. The turbine seal member as recited in claim 3, wherein each of the plurality of mechanical indentations includes a mouth at a surface of the ceramic layer, the mouth having sides that are oriented at about 45° relative to a central axis of a gas turbine engine.

5. The turbine seal member as recited in claim 1, wherein each of the plurality of mechanical indentations is conical shaped.

6. The turbine seal member as recited in claim 1, wherein the plurality of mechanical indentations includes a first row of mechanical indentations and a second row of mechanical indentations that is axially offset from the first row of mechanical indentations relative to a central axis of a gas turbine engine.

7. The turbine seal member as recited in claim 1, wherein each of the plurality of mechanical indentations tapers from a surface of the ceramic layer to an apex.

8. The turbine seal member as recited in claim 1, wherein the ceramic layer comprises a linear indentation density of about 200 mechanical indentations per inch.

9. The turbine seal member as recited in claim 1, wherein the ceramic layer comprises an indentation density of about 6.67 mechanical indentations per inch.

10. The turbine seal member as recited in claim 1, wherein the ceramic layer comprises a linear indentation density of about 10-200 mechanical indentations per inch.

11. The turbine seal member as recited in claim 1, further comprising a bond layer between the ceramic layer and the turbine seal substrate.

12. The turbine seal member as recited in claim 11, wherein the bond layer is selected from a group consisting of nickel alloy, platinum, gold, silver, MCrAlY, and combinations thereof, where the M includes at least one of nickel, cobalt, iron, or a combination thereof, Cr is chromium, Al is aluminum and Y is yttrium.

13. The turbine seal member as recited in claim 1, wherein the plurality of mechanical indentations have an indentation span along the surface of the ceramic layer and an indentation depth into the ceramic layer, and the indentation span is equivalent to the indentation depth.

14. The turbine seal member as recited in claim 1, wherein the plurality of mechanical indentations have an indentation span along the surface of the ceramic layer and an indentation depth into the ceramic layer, and the indentation span is greater than the indentation depth.

15. A turbine seal member for use in a gas turbine engine, comprising:
- a turbine seal substrate having a gas-path side; and
- a ceramic layer disposed on the gas-path side of the turbine seal substrate, the ceramic layer having a plurality of mechanical indentations, wherein each of the plurality of mechanical indentations tapers from a surface of the ceramic layer to an apex, and includes microcracks extending from each of the mechanical indentations.

16. A turbine seal member for use in a gas turbine engine, comprising:
- a turbine seal substrate having a gas-path side; and
- a ceramic layer disposed on the gas-path side of the turbine seal substrate, the ceramic layer having a plurality of pyramidal indentations that taper from a surface of the ceramic layer to an apex and a corresponding plurality of compacted ceramic regions adjacent the apexes of the pyramidal indentations.

17. The turbine seal member as recited in claim 16, wherein each of the plurality of compacted ceramic regions includes a first density and a remaining portion of the ceramic layer includes a second density that is less than the first density.

18. The turbine seal member as recited in claim 16, wherein the ceramic layer comprises an indentation density of about 200 mechanical indentations per inch.

19. The turbine seal member as recited in claim 16, wherein the ceramic layer comprises an indentation density of about 6.67 mechanical indentations per inch.

20. The turbine seal member as recited in claim 16, wherein the ceramic layer comprises an indentation density of about 10-200 mechanical indentations per inch.

21. The turbine seal member as recited in claim 16, wherein the ceramic layer includes microcracks extending from each of the mechanical indentations.

22. A method of controlling internal stresses of a ceramic layer of a turbine seal member, comprising:

mechanically indenting the ceramic layer to form a plurality of mechanical indentations for altering the internal stresses to form stress relief cracks.

23. The method as recited in claim 22, further comprising forming the plurality of mechanical indentations with a diamond.

24. The method as recited in claim 22, further comprising compacting regions of the ceramic layer adjacent apexes of the plurality of mechanical indentations.

25. The method as recited in claim 22, further comprising forming microcracks adjacent the plurality of mechanical indentations.

26. The method as recited in claim 22, further comprising forming the plurality of mechanical indentations with an indentation density of about 10-200 mechanical indentations per inch.

27. The method as recited in claim 22, further comprising forming a first row of the mechanical indentations and a second row of mechanical indentations that is axially offset from the first row of mechanical indentations relative to a central axis of a gas turbine engine.

* * * * *